United States Patent
Cardona et al.

(10) Patent No.: US 9,229,891 B2
(45) Date of Patent: *Jan. 5, 2016

(54) DETERMINING A DIRECT MEMORY ACCESS DATA TRANSFER MODE

(71) Applicant: International Business Machines Corporation, Armonk, NY (US)

(72) Inventors: Omar Cardona, Cedar Park, TX (US); Matthew R. Ochs, Austin, TX (US); Vikramjit Sethi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,497

(22) Filed: Jan. 13, 2014

(65) Prior Publication Data

US 2015/0142995 A1 May 21, 2015

Related U.S. Application Data

(63) Continuation of application No. 14/081,432, filed on Nov. 15, 2013, now Pat. No. 8,984,179.

(51) Int. Cl.
*G06F 13/28* (2006.01)

(52) U.S. Cl.
CPC ..................................... *G06F 13/28* (2013.01)

(58) Field of Classification Search
CPC ....................................................... G06F 13/28
See application file for complete search history.

(56) References Cited

U.S. PATENT DOCUMENTS

| 4,947,366 | A | 8/1990 | Johnson |
| 5,659,696 | A | 8/1997 | Amini et al. |
| 5,826,107 | A | 10/1998 | Cline et al. |
| 6,145,030 | A | 11/2000 | Martwick |
| 6,598,097 | B1 * | 7/2003 | Daniels et al. ................ 710/22 |
| 6,684,274 | B1 | 1/2004 | Chong, Jr. |
| 6,725,289 | B1 | 4/2004 | Waldspurger et al. |
| 6,804,729 | B2 | 10/2004 | Swanberg |

(Continued)

FOREIGN PATENT DOCUMENTS

| EP | 0784277 A1 | 7/1997 |
| EP | 1787205 B1 | 3/2009 |
| WO | 2007088426 A1 | 8/2007 |

OTHER PUBLICATIONS

Hart, et al., "Determining a Mapping Mode for a DMA Data Transfer," U.S. Appl. No. 14/153,450, filed Jan. 13, 2014.

(Continued)

*Primary Examiner* — Henry Tsai
*Assistant Examiner* — Jing-Yih Shyu
(74) *Attorney, Agent, or Firm* — Thomas E. Tyson; Mark G. Edwards (57) ABSTRACT

In response to receiving a request for a DMA data transfer, a DMA transfer mode may be determined based on based on the size of the requested DMA data transfer and profile data of an I/O adapter. The profile data for the I/O adapter may include a physical location of the I/O adapter or a number of clients supported by the I/O adapter. The DMA transfer mode may also be determined based on a preference of an application or an I/O device. Moreover, the DMA transfer mode may be determined based on a CPU usage metric being outside of a threshold for the CPU usage metric or on a memory usage metric being outside of a threshold for the memory usage metric.

9 Claims, 6 Drawing Sheets

(56) References Cited

U.S. PATENT DOCUMENTS

| | | |
|---|---|---|
| 7,415,550 B2 | 8/2008 | Tanaka et al. |
| 7,533,198 B2 | 5/2009 | Bartley et al. |
| 7,676,646 B2 | 3/2010 | Cohen |
| 7,685,330 B2 | 3/2010 | Banerjee et al. |
| 7,783,793 B2 | 8/2010 | Bartley et al. |
| 7,870,307 B2 | 1/2011 | Suba et al. |
| 7,877,524 B1 | 1/2011 | Annem et al. |
| 7,917,597 B1 | 3/2011 | Lentini |
| 8,001,430 B2 | 8/2011 | Shasha et al. |
| 8,250,281 B2 | 8/2012 | Bauman et al. |
| 8,621,167 B2 * | 12/2013 | Gara et al. ............ 711/162 |
| 2004/0064601 A1 * | 4/2004 | Swanberg ............ 710/22 |
| 2005/0223136 A1 * | 10/2005 | Tanaka et al. ............ 710/22 |
| 2006/0053236 A1 * | 3/2006 | Sonksen et al. ............ 710/22 |
| 2008/0307122 A1 | 12/2008 | Butler et al. |
| 2008/0313357 A1 * | 12/2008 | Wang et al. ............ 710/14 |
| 2009/0287857 A1 | 11/2009 | Vu |
| 2010/0106865 A1 * | 4/2010 | Kobori ............ 710/22 |
| 2010/0169673 A1 | 7/2010 | Saripalli |
| 2010/0180158 A1 * | 7/2010 | Corry et al. ............ 714/38 |
| 2010/0251268 A1 | 9/2010 | Cardona et al. |
| 2013/0103857 A1 | 4/2013 | Fukada |

OTHER PUBLICATIONS

Hart et al., "Determining a Mapping Mode for a DMA Data Transfer", U.S. Appl. No. 13/678,970, filed Nov. 16, 2012.
Cardona et al., "Determining a Direct Memory Access Data Transfer Mode", U.S. Appl. No. 14/081,432, filed Nov. 15, 2013.
Hart et al., "Determining a Mapping Mode for a DMA Data Transfer", U.S. Appl. No. 14/153,450, filed Jan. 13, 2014.

* cited by examiner

| PROFILE DATA | | | | | |
|---|---|---|---|---|---|
| PROFILE | A | B | C | D | E |
| ADAPTER 106A - LOCATION | 3 | 3 | 3 | 3 | 3 |
| ADAPTER 106A - # CLIENTS | 1 | 3 | 5 | 4 | 1 |
| ADAPTER 106A - # BUS TYPES | 1 | 1 | 1 | 1 | 1 |
| ADAPTER 106B - LOCATION | 1 | 5 | 7 | 3 | 2 |
| ADAPTER 106B - # CLIENTS | 2 | 2 | 2 | 2 | 2 |
| ADAPTER 106B - # BUS TYPES | 0.10 | 0.20 | 0.80 | 0.40 | 0.10 |
| CPU USAGE METRIC | 0.50 | 0.80 | 0.90 | 0.20 | 0.15 |
| MEMORY USAGE METRIC | 01:00 | 08:00 | 15:00 | 18:00 | 23:00 |
| CAPTURE TIME | | | | | |

| TRANSFER SIZE (BYTES) | PROFILE A TIME (MS) | | |
|---|---|---|---|
| | MAP/UNMAP | DATA COPY | Δ |
| 50 | 42 | 22 | 20 |
| 80 | 44 | 24 | 20 |
| 128 | 45 | 28 | 17 |
| 205 | 49 | 35 | 14 |
| 328 | 55 | 44 | 11 |
| 524 | 68 | 55 | 13 |
| 839 | 74 | 68 | 6 |
| 1342 | 81 | 77 | 4 |
| 2147 | 85 | 89 | -4 |
| 3436 | 95 | 101 | -6 |
| 5498 | 113 | 133 | -20 |
| 8796 | 132 | 185 | -53 |
| 14074 | 169 | 226 | -57 |
| 22518 | 207 | 350 | -143 |
| 36029 | 588 | 806 | -218 |
| 57646 | 842 | 1558 | -716 |

DETERMINING A DIRECT MEMORY ACCESS DATA TRANSFER MODE

CROSS-REFERENCE TO RELATED APPLICATIONS

This application is a continuation of co-pending U.S. patent application Ser. No. 14/081,432, filed Nov. 15, 2013. The aforementioned related patent application is herein incorporated by reference in its entirety.

BACKGROUND

Embodiments relate generally to data transfers in computer systems, and more particularly, to direct memory access (DMA) data transfers.

A computer system may include a central processing unit (CPU) or processor, a memory, a bus, and a device attached to an input/output (I/O) port. A wide variety of devices may be attached to a computer. For example, an external storage device, a network interface card, or an input or output device controller, such as a key board or sound card, may be attached to a computer.

A processor executes instructions contained in a computer program. Certain program instructions, when executed by the processor, cause data to be transferred from memory to a port or from a port to memory. This is sometimes referred to as programmed memory input/output. DMA is another technique for transferring data. Once a DMA transfer is initiated, the data transfer bypasses the processor. A separate circuit, such as a DMA controller, temporarily takes control of the bus away from the processor and transfers data from memory to an attached device or from the attached device to memory. DMA hardware may provide one or more I/O channels that allow data transfers independent of the CPU. An advantage of transferring data using a hardware circuit, such as DMA controller, is that the processor may perform other work while the transfer is taking place. Another advantage is that the transfer may be faster than transferring the data using processor instructions.

SUMMARY

Embodiments are directed to methods, computer readable storage medium, and a computer system for determining a DMA transfer mode for a DMA data transfer. The method may include receiving a request for a DMA data transfer. In addition, the method may include determining a DMA transfer mode for the requested DMA data transfer based on the size of the requested DMA data transfer and profile data of an I/O adapter. The DMA transfer mode may be a data copy mode or a map/unmap mode. In addition, the method may include performing the requested DMA transfer using the determined DMA transfer mode.

The methods may also include determining a DMA transfer mode based on the profile data of an I/O adapter, wherein the profile data for the I/O adapter includes a physical location of the I/O adapter or the profile data for the I/O adapter includes a number of clients supported by the I/O adapter.

In addition, the methods may also include determining a DMA transfer mode based on a preference of an application or an I/O device.

Moreover, the methods may include determining a DMA transfer mode based on a CPU usage metric being outside of a threshold for the CPU usage metric, the CPU usage metric being determined in a time interval immediately previous to the request for a DMA data transfer. Further, the methods may include determining a DMA transfer mode for the requested DMA data transfer based on a memory usage metric being outside of a threshold for the memory usage metric, the memory usage metric being determined in a time interval immediately previous to the request for a DMA data transfer.

BRIEF DESCRIPTION OF THE SEVERAL VIEWS OF THE DRAWINGS

In the drawings and the Detailed Description, like numbers generally refer to like components, parts, steps, and processes.

DETAILED DESCRIPTION

DMA allows external devices to directly transfer data to or from a system memory. Two modes may be used to perform a DMA operation. The first mode uses one or more "persistent" DMA memory regions. The persistent DMA memory regions are regions that have been pre-allocated for use with DMA transfers. In the case of an external device transferring data to system memory, the CPU may copy the data received in a DMA transfer from the persistent memory region to another region of memory, such as an area being used by a particular application program. In the case of data being transferred to an external device from system memory, the CPU may first copy the data to be transferred to the persistent memory region from another region of memory. The first mode may be referred to as a "data copy" mode. DMA data transfers using the data copy mode always use this persistent DMA memory region to transfer data between an external device, such as an I/O adapter, and memory. The use of the persistent memory region avoids the need allocate a region of memory for each I/O transfer. However, the data copy mode uses CPU resources for copying the data within the system memory.

The second mode allocates one or more regions of memory for each DMA operation prior to each request for a DMA data transfer. With the second mode, DMA hardware, such as an input/output memory management unit (I/O MMU), may map or allocate a temporary DMA memory region. Any area within the system memory may be allocated. Once the DMA data transfer is complete the mapped memory area may be unmapped and returned to the general use of the system. The second mode may be referred to as a "map/unmap" mode. The second mode requires time to allocate memory, but saves CPU resources by not requiring the operation of copying the data within the system memory.

Typically, device drivers in current operating systems are designed to use either the data copy mode or the map/unmap mode. The mode may be predetermined and may not be able to be changed at runtime. However, because of the dynamic nature of computer systems in both their software and hardware configurations, the predetermined mode may not be the best mode for a current system profile and, therefore, the I/O operation performance may be suboptimal.

Embodiments of the invention provide an automated process by which a mapping mode may be determined at runtime. In response to receiving a request for a DMA data transfer at runtime, a DMA transfer mode may be determined based on the size of the requested DMA data transfer and profile data of an I/O adapter. The profile data for the I/O adapter may include a physical location of the I/O adapter or a number of clients supported by the I/O adapter. The DMA transfer mode may also be determined based on a preference of an application or an I/O device. Moreover, the DMA transfer mode may be determined based on a CPU usage metric being outside of a threshold for the CPU usage metric or on a memory usage metric being outside of a threshold for the memory usage metric.

Figure 1:
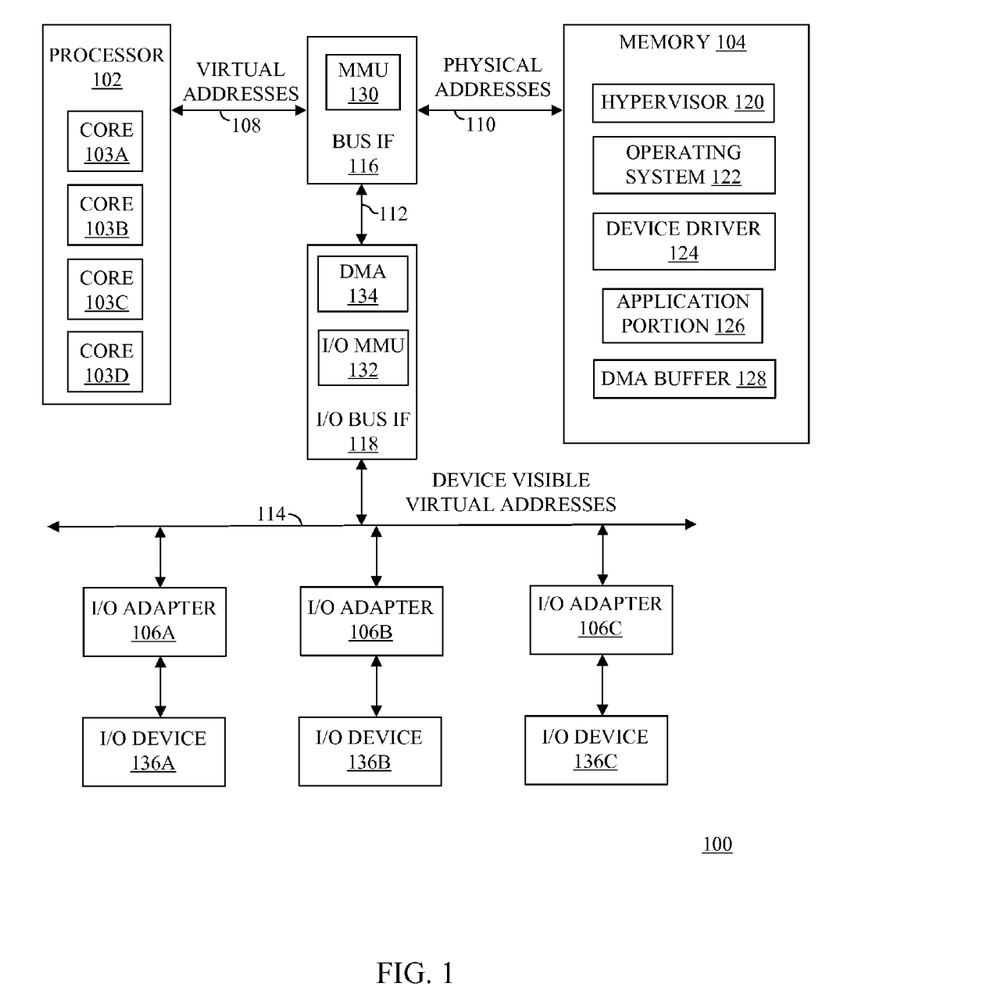
FIG. 1 depicts a block diagram of an exemplary computer system in which various embodiments may be implemented.

FIG. 1 depicts a high-level block diagram of an exemplary computer system 100 for implementing various embodiments. The mechanisms and apparatus of the various embodiments disclosed herein apply equally to any appropriate computing system. The major components of the computer system 100 may include one or more processors 102, a memory 104, one or more input/output (I/O) adapters 106, all of which are communicatively coupled, directly or indirectly, for inter-component communication via a host bus 108, a memory bus 110, a bus 112, an I/O bus 114, a bus interface unit (IF) 116, and an I/O bus interface unit 118.

The computer system 100 may contain one or more general-purpose programmable CPUs, herein generically referred to as the processor 102. In an embodiment, the computer system 100 may contain multiple processors 102; however, in another embodiment, the computer system 100 may alternatively include a single CPU. Each processor 102 executes instructions stored in the memory 104 and may include one or more levels of on-board cache. Each processor 102 may include one or more cores 103, e.g., cores 103A-103D.

In an embodiment, the memory 104 may include a random-access semiconductor memory, storage device, or storage medium (either volatile or non-volatile) for storing or encoding data and programs. In another embodiment, the memory 104 represents the entire virtual memory of the computer system 100, and may also include the virtual memory of other computer systems coupled to the computer system 100 or connected via a network. The memory 104 is conceptually a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor 102. Memory may be further distributed and associated with different CPUs or sets of CPUs, as is known in any of various so-called non-uniform memory access (NUMA) computer architectures.

The memory 104 may store all or a portion of a hypervisor 120, one or more operating systems 122, and one or more device drivers 124. The hypervisor 120 may also be referred to as a virtual machine monitor. A device driver 124 may be a computer program that controls a particular device using low-level commands that the device understands. The device driver 124 may translate higher-level application code to low-level, device-specific commands. In addition, a portion of the memory 104 may be allocated for an application program, herein referred to as an application portion 126. Further, a portion of the memory 104 may be allocated for a DMA buffer 128. The DMA buffer 128 may be a persistent or a temporary memory region. In various embodiments, the DMA buffer 128 may include two or more persistent DMA memory regions, two or more temporary memory regions, or two or more of both types of regions at any point in time. These programs and data structures are illustrated as being included within the memory 104 in the computer system 100, however, in other embodiments, some or all of them may be on different computer systems and may be accessed remotely, e.g., via a network.

The computer system 100 may use virtual addressing mechanisms that allow the programs of the computer system 100 to behave as if they only have access to a large, single storage entity instead of access to multiple, smaller storage entities. The processor 102 and various devices, such as the I/O adapter 106, may use virtual addresses that are translated into physical addresses in the memory 104. Thus, while the hypervisor 120, operating system 122, and device driver 124 are illustrated as being included within the memory 104, one or more of them are not necessarily all completely contained in the same storage device at the same time. Further, although the modules, units, and databases of the hypervisor 120, operating system 122, and device driver 124 are illustrated as being separate entities in FIG. 1, in other embodiments some of them, portions of some of them, or all of them may be packaged together.

In an embodiment, the modules, units, and databases of the hypervisor 120, operating system 122, and the device driver 124 may include instructions or statements that execute on the processor 102 or instructions or statements that are interpreted by instructions or statements that execute on the processor 102 to carry out the functions as further described below. In another embodiment, the modules, units, and databases of the hypervisor 120, operating system 122, and device driver 124 are implemented in hardware via semiconductor devices, chips, logical gates, circuits, circuit cards, and/or other physical hardware devices in lieu of, or in addition to, a processor-based system. In an embodiment, the modules, units, and databases of the hypervisor 120, operating system 122, and device driver 124 may include data in addition to instructions or statements.

The bus interface unit 116 may handle communications among the processor 102, the memory 104, and the I/O bus interface unit 118. The bus interface unit 116 may include a memory management unit (MMU) 130. The MMU 130 handles memory requests for the processor 102. The MMU 130 may translate processor-visible virtual addresses to physical addresses of the memory 104. In addition, one or more of the functions provided by the bus interface unit 116 may be on board an integrated circuit that also includes the processor 102.

The I/O bus interface unit 118 may be coupled with the I/O bus 114 for transferring data to and from the various I/O units. The I/O bus interface unit 118 communicates with multiple I/O adapters 106A, 106B, and 106C, which are also known as I/O processors (IOPs) or I/O interface units, through the I/O bus 114. The IO bus interface unit 118 may include an I/O MMU 132 and a DMA unit 134. The I/O MMU 132 translates virtual addresses visible to various I/O devices to physical addresses of the memory 104. The DMA 134 may be used to transfer data between the memory 104 and the memory of an I/O adapter 106. The DMA 134 may provide one or more DMA channels.

In order to use DMA, it is usually necessary to allocate a portion of system memory as an area to be used specifically for DMA operations, which may be referred to as "mapping" a buffer in the memory. The I/O MMU 132 may be used to map a DMA buffer 128 in the memory 104. In a mapping operation, the I/O MMU 132 allocates one or more regions in the memory as a buffer and generates a table for mapping virtual addresses used by a device to physical addresses in the memory. The I/O MMU 132 may be used to map a persistent DMA buffer or a temporary DMA buffer.

The I/O adapters 106 may support communication with a variety of storage and I/O devices. In addition, the I/O adapters 106 may support the attachment of one or more disk drives or direct access storage devices. The I/O adapters 106 may provide an interface to any of various other I/O devices or devices of other types, such as printers or fax machines. The I/O adapters 106 may provide one or more communication paths from the computer system 100 to other digital devices and computer systems; these communication paths may include, e.g., one or more networks. In various embodiments, an I/O adapter 106 may be a device for connecting SCSI, Fibre Channel, or eSATA devices. In various embodiments, an I/O adapter 106 may be a device for connecting to IDE, Ethernet, Firewire, PCIe, or USB buses. In an embodiment, an I/O adapter 106 may be a host Ethernet adapter.

Although the computer system 100 shown in FIG. 1 illustrates a particular bus structure providing a direct communication path among the processors 102, the memory 104, the bus interface 116, and the I/O bus interface unit 118, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 118 and the I/O bus 114 are shown as single respective units, the computer system 100 may, in fact, contain multiple I/O bus interface units 118 or multiple I/O buses 114. While multiple I/O adapters are shown, which separate the I/O bus 114 from various communications paths running to the various I/O devices, in other embodiments, some or all of the I/O devices are connected directly to one or more system I/O buses.

Figure 2:
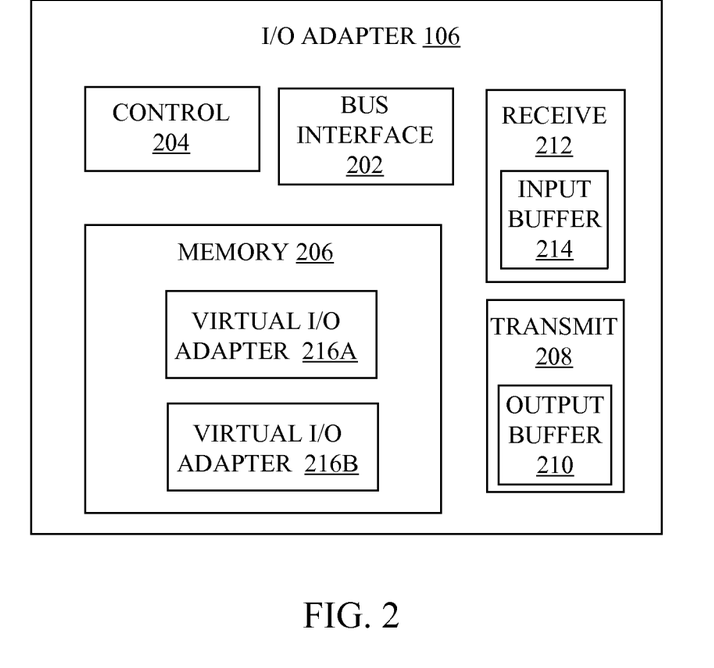
FIG. 2 is a block diagram of an I/O adapter of FIG. 1 according to various embodiments.

FIG. 2 is a block diagram of an I/O adapter 106 of FIG. 1 according to various embodiments. The I/O adapter 106 may include bus interface logic 202, control logic 204, and a memory 206. The bus interface logic 202 handles all communications between the I/O adapter 106 and the I/O bus interface unit 108. Control logic 204 controls the operations of the I/O adapter 106. Control logic 204 may execute instructions stored in memory 206. In addition, the I/O adapter 106 may include transmit logic 208 and receive logic 212. The transmit logic 208 includes an output buffer 210. The receive logic 212 includes an input buffer 214. Transmit logic 208 handles transmission of data to an I/O device. Transmit logic 208 temporarily stores data to be transmitted in output buffer 210. Receive logic 212 handles reception of data from an I/O device. Receive logic 212 temporarily stores data received from an I/O device in input buffer 214.

The I/O adapters 106 are physical adapters that may include computer hardware and software. As shown in FIG. 2, an I/O adapter 106 may include two or more virtual I/O adapters 216A and 216B. The I/O adapter 106 may include one or more separate virtual I/O adapters 216 for each of the two or more LPARs 302. Each virtual I/O adapters 216 may use a range of I/O memory addresses in the address space of an LPAR as a DMA buffer 128. While the virtual I/O adapters 216 are shown as being stored in memory 206 of FIG. 2, in other embodiments the virtual I/O adapters 216 may be stored in the memory 104.

In various embodiments, an I/O adapter 106 may be a multifunction I/O adapter, i.e., an I/O adapter that is capable of transferring data using two or more different technologies. One example of multifunction I/O adapter is an I/O adapter capable of transferring data over an Ethernet network and over a Fibre Channel network. In embodiments in which the I/O adapter 106 is a multifunction I/O adapter, it may use a different scatter-gather model for each technology. Scatter-gather I/O may also be referred to as vectored I/O. Scatter-gather I/O refers to a single operation that may include gathering data from two or more different memory locations or buffers, scattering data to two or more different memory locations, or both. Shared access to a multifunction I/O adapter may impact the determination of which DMA transfer mode (data copy or map/unmap) is likely to be most suitable for minimizing latency or maximizing throughput at a given moment in time. Access to a multifunction I/O adapter may be shared between two or more different applications or threads of a single application. In addition, access to a multifunction I/O adapter may be shared between two or more logical partitions. In various embodiments, latencies or throughputs associated with different shared access configurations associated with a multifunction I/O adapter may be taken into account when determining performance metrics.

The I/O devices 136 may be any type of storage or I/O device. An I/O device 136, as used herein, is intended to represent generically any device or devices that may be attached to an I/O adapter. For example, an I/O device 136, as used herein, may represent a network. As another example, an I/O device 136 may be a second instance of computer system 100, which serves a storage server.

The computer system 100 may include server blades or various components mounted in one or more racks. An I/O adapter 106 may be disposed at various locations in the one or more racks. Each I/O adapter 106 may have a location code that specifies a physical location for the I/O adapter. Examples of location codes include Central Electronic Codes (CEC) and I/O enclosure codes. For example, the location code for a first I/O adapter 106A may specify that it is plugged into a slot in the main system planar, while the location code for a second I/O adapter 106B may specify that it is plugged into a slot that is located in a drawer several feet or yards away from the main system planar. DMA transfers that involve I/O adapters 106 in different physical locations may experience different latencies. In various embodiments, latencies associated with different physical locations may be taken into account when determining performance metrics. As an example, access to an I/O adapter 106 located in an I/O drawer may be slower compared to an I/O adapter 106 in a slot on the main system planar.

Figure 3:
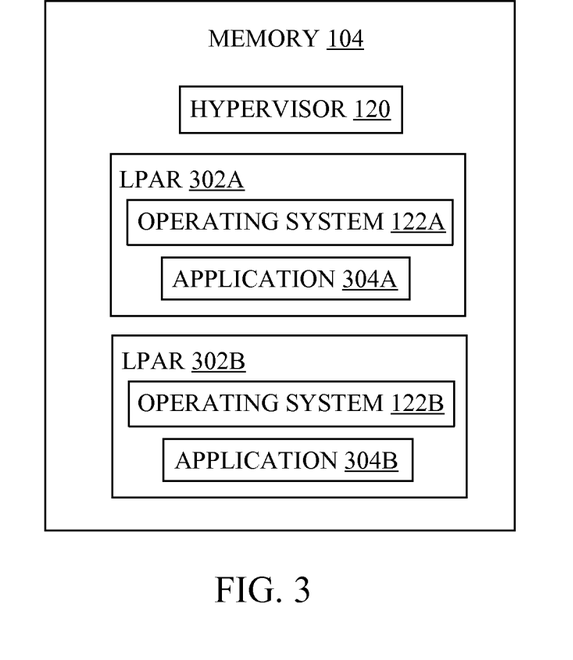
FIG. 3 illustrates the memory of FIG. 1 according to various alternative embodiments.

FIG. 3 illustrates the memory 104 of FIG. 1 according to various alternative embodiments. As shown in the example of FIG. 3, the memory 104 may include two or more logical partitions ("LPARs") 302A and 302B. One or more physical I/O adapters 106 may support one or more virtual I/O adapters. In particular, referring again to FIGS. 1 and 2, a single physical I/O adapter 106A may support multiple virtual I/O adapters 216A and 216B for use with the LPARs 302A and 302B. Alternatively, the physical I/O adapters 106A and 106B may respectively support the virtual I/O adapters 216A and 216B. In yet another alternative, the physical I/O adapters 106A, 106C, and 106B may collectively support the virtual I/O adapters 216A and 216B. In various embodiments, a single physical I/O adapter 106 may support two or more virtual adapters according to the Single Root-I/O Virtualization (SR-IOV) or the Multiple Root-I/O Virtualization (MR-IOV) standard.

Each LPAR 302 may include data structures and services administered by the hypervisor 120. Applications programs 304A and an operating system 122A may run in LPAR 302A concurrently with other application programs 304B and an operating system 122B running in LPAR 302B. While the LPARs share the same physical system, they allow the single system to function as if it were two or more independent computers systems. From the perspective of an application or any instance of an operating system, an LPAR appears as an entire computer.

The hypervisor 120 administers LPARs. The hypervisor 120 may create, assign resources to, and delete LPARs. The hypervisor 120 may perform these actions at startup in accordance with configuration information, at run time as instructed by a system administrator, or at run time as directed by load balancing components of a computer. The hypervisor 120 may implement multiple LPARs on a single computer 100 by assigning to each LPAR 302 one or more "virtual processors," each of which represents a portion of the processor time of one or more physical computer processors 102 or processor cores 102A-102D. In addition, the hypervisor 120 may assign to each LPAR 302 one or more virtual I/O adapters. In various embodiments, the hypervisor 120 may include a profile determining unit that determines a system configuration.

Figure 4:
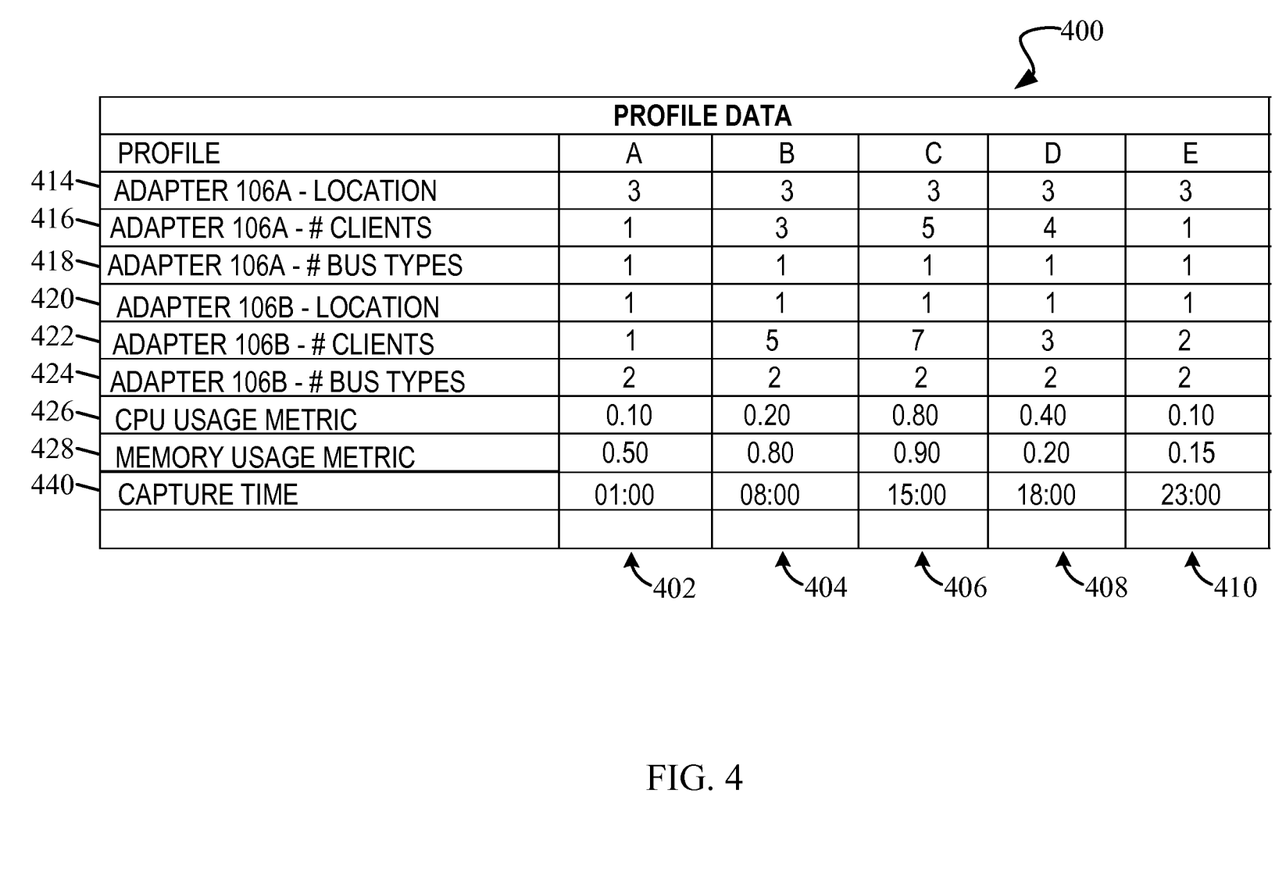
FIG. 4 depicts a diagram of an example data structure for profile data according to an embodiment.

FIG. 4 depicts a diagram of an example data structure for profile data 400, according to an embodiment. Profile data 400 may include various system profiles. Profile data 400 may include various I/O adapter profiles. The stored system and I/O adapter profiles may be stored in the memory 104 or memory 206. The profile data 400 may be generated by a profile determining unit. In some embodiments, the profile determining unit may be a component of an operating system 122. In other embodiments, the profile determining unit may be a component of a hypervisor 120. In yet other embodiments, the profile determining unit may be a component of a device driver 124.

The profile data 400 shows example profiles A, B, C, D and E designated by reference numbers 402, 404, 406, 408, and 410, respectively. Each profile may include profile data for one or more I/O adapters 106, e.g., 106A and 106B. The profile data for I/O adapters 106 may include an I/O adapter location code field 414, 420, a number of clients supported by the I/O adapters 106 field 416, 422, a number of bus technologies supported by the I/O adapters 106 field 418, 424. Each profile may include profile data for one or more processors, such as CPU usage metric 426. In addition, each profile may include profile data for one or more memories 104, such as memory usage metric 428. Further, each profile may include profile data for a capture time 440. The capture time 440 may include both a time of day and a time interval in which one or more DMA transfers were performed. For example, a ten minute interval and 01:00 hours.

The I/O adapter location code field 414, 420 may identify a physical location of the adapter. The I/O adapter location code field 414, 420 may be CEC or I/O enclosure code. Alternatively, a CEC or I/O enclosure code may categorized into a distance zone, such as zone 1, 2, or 3, as shown, where each zone is associated with a particular range of latencies. The number of "clients" supported by the I/O adapters 106 field 416, 422 may identify a number of processes, thread, LPARs, or the like that the I/O adapter 106 supports. The number of bus technologies supported by the I/O adapters 106 field 418, 424 identifies the number of bus technologies the adapter actively supported at the capture time. The CPU usage metric 426 may indicate average CPU usage (or some other similar metric) during the capture time interval, which may range from zero to one hundred percent, expressed in decimal form in FIG. 4. The memory usage metric 428 may indicate average memory footprint used or an average time that the memory was in use during the capture interval. A capture interval may be any time interval previous to a request for a DMA transfer. In various embodiments, a capture interval may be a time interval immediately previous to a request for a DMA transfer, such as time required to perform 100-100,000 instruction cycles, a 1 millisecond to 1 second time period, or any other suitable interval.

In various embodiments, other profile data parameters may be included. In other embodiments, fewer profile data parameter may be included. Each record may represent available system profile data and may include any information related to that system profile at capture time 440.

Figure 5:
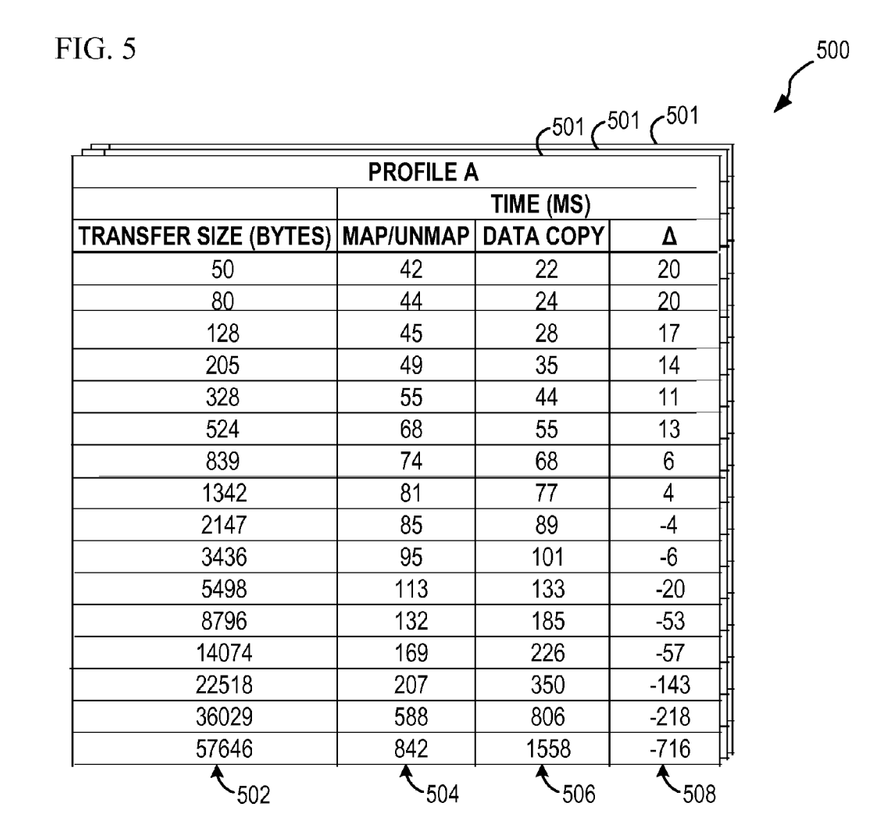
FIG. 5 depicts a diagram of an example data structure for performance data according to an embodiment.

FIG. 5 depicts a diagram of an example data structure 500 for performance data, according to an embodiment. The data structure 500 may be stored in memory 104 or memory 206. The data structure 500 may include for performance data for each profile, for example, profiles A, B, C, D and E (501). The data structure 500 may include one or more DMA transfer sizes (502) for each profile. For each DMA transfer size, the data structure 500 may include DMA transfer times (504, 506) for transfers using the map/unmap mode and data copy mode, respectively. In addition, for each DMA transfer size, the data structure 500 may include a time delta or difference (508) between the data copy mode and map/unmap mode transfer times.

Figure 6:
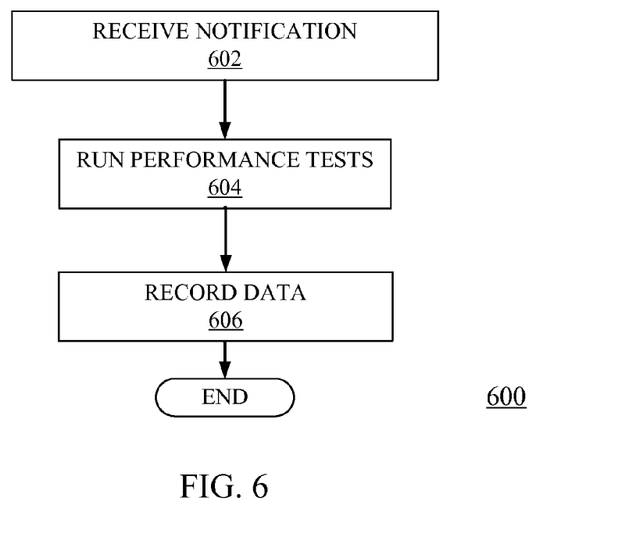
FIG. 6 depicts a flow chart of an example process for determining profile data according to an embodiment.

FIG. 6 depicts a flow chart of an example process 600 for determining performance data according to an embodiment. The process 600 may be used to generate the data structure 500. In operation 602, a notification may be received by the profile determining unit. A notification may be sent by a hypervisor, an operating system, an application, or other process. A notification may include: a notification that a system profile data has changed, a notification that a predetermined time interval has elapsed, or any similar system profile notification. For example, an I/O adapter 106 has been added or removed from the system 100 in a "hot plug/unplug" operation. As another example, an LPAR 302 may be added or removed from the system 100. As yet another example, a notification may be received that the system has completed an initialization process.

In operation 604, one or more pairs of DMA performance tests may be performed. A DMA performance test may include performing a data transfer using both mapping modes. For example, a first test may include performing one or more transfers using the data copy mode and collecting one or more associated performance statistics, such as transfer time, latency, or throughput. A second test may include performing one or more transfers using the map/unmap mode and collecting one or more associated performance statistics, such as transfer time, latency, or throughput. The first and second tests are performed with data transfers of the same size. The operation 604 may include repeating the first and second tests for a variety of data sizes. Referring back to FIG. 5, exemplary transfer sizes ranging from 50 bytes to 57 KB are shown. In addition, operation 604 may include determining a time delta or difference between the data copy mode and map/unmap mode transfer times. In operation 606, the values of the profile data may be recorded or stored in the data structure 500.

Figure 7:
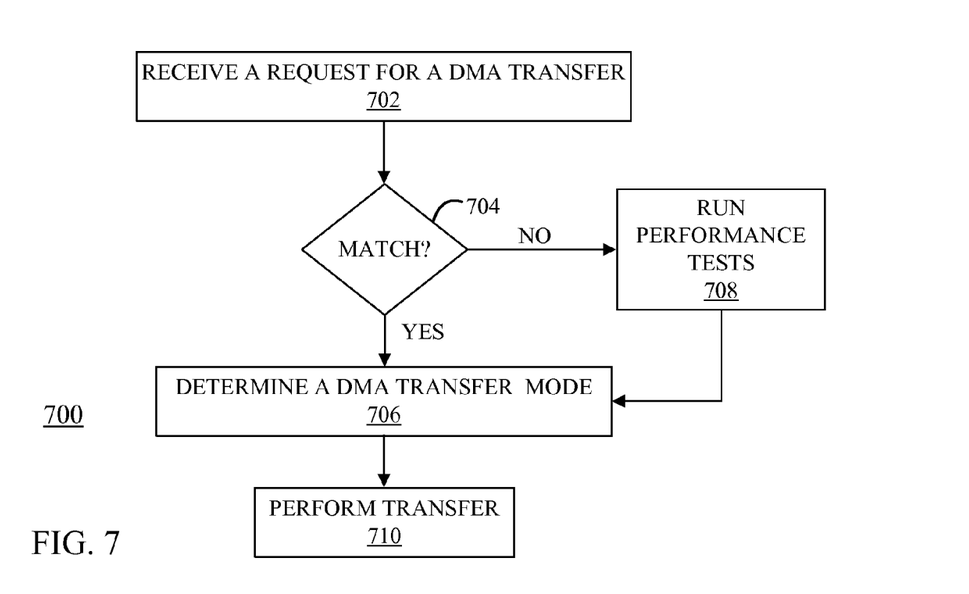
FIG. 7 depicts a flow chart of an example process for determining a DMA transfer mode for a DMA data transfer according to various embodiments.

FIG. 7 depicts a flow chart of an example process 700 for determining a DMA transfer mode for a DMA data transfer according to various embodiments. In operation 702, a request for a DMA data transfer may be received. The request may be received, for example, from a process or thread by a device driver. In addition, the request may be received from an external device by an I/O adapter 106. In operation 704, it may be determined whether the data structure 500 includes system profile data that substantially matches the current system profile, i.e., a system profile at the time the request is received. If the data structure 500 includes system profile data that substantially matches the current system profile, a DMA transfer mode may be determined in operation 706. If the data structure 500 does not include a system profile data that substantially matches the current system profile, one or more pairs of DMA performance tests may be performed in operation 708 (operation 708 may be the same as operations 604 and 606 of process 600), after which the operation 706 may be performed. In operation 710, the requested DMA transfer may be performed using the determined DMA transfer mode.

Figure 8:
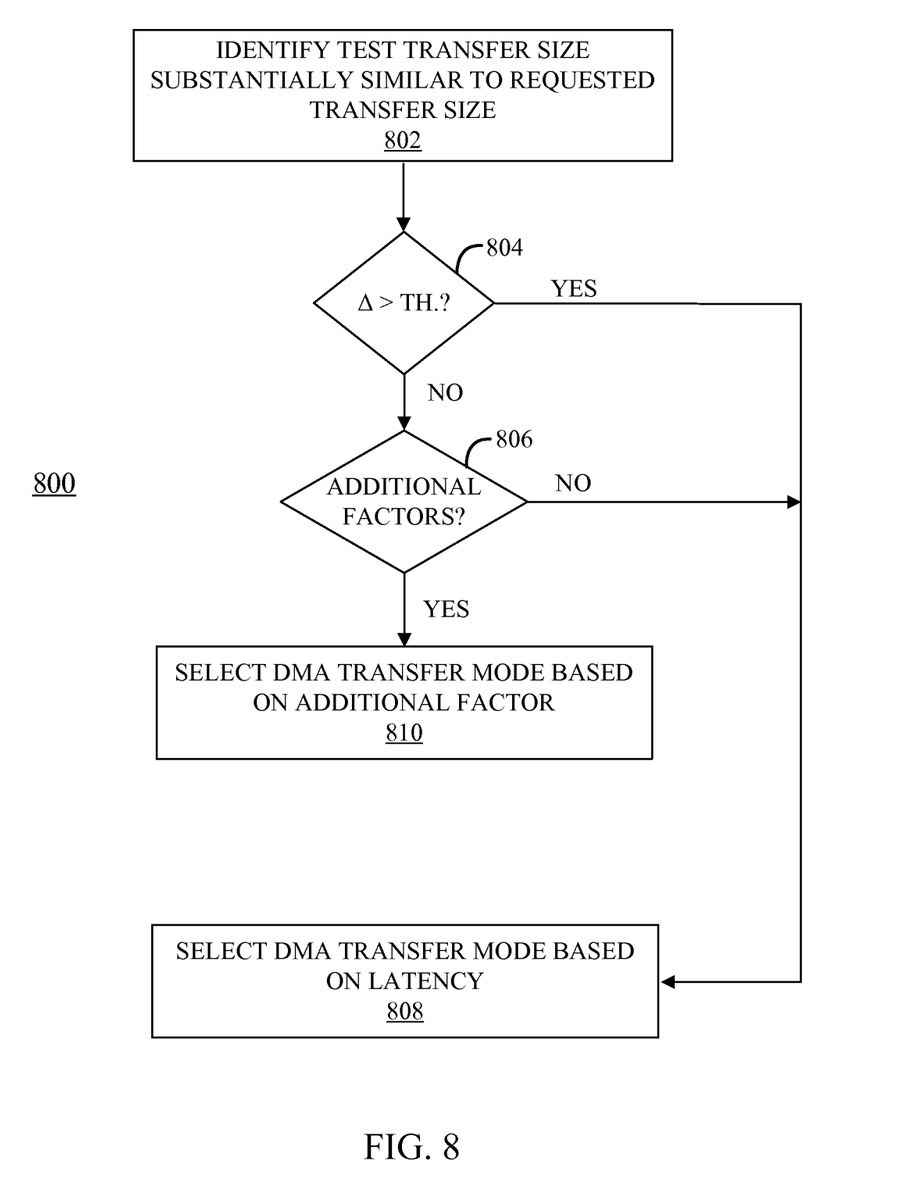
FIG. 8 depicts a flow chart of an example process for determining a DMA transfer mode for a DMA data transfer according to various embodiments.

FIG. 8 depicts a flow chart of an example process 800 for determining a DMA transfer mode for a DMA data transfer according to various embodiments. In various embodiments, the operation 706 may include the process 800.

In operation 802, one or more test data transfers from data structure 500 (for system profile data that substantially matches the current system profile) that are substantially similar in size to the size of the data of the transfer request may be identified. A size of a data transfer request may be substantially similar to a test data transfer size if the two sizes are within five percent of one another. In other embodiments, other similar percentages may be used, e.g., one to ten percent. For example, referring to FIG. 5, if the size of a requested DMA data transfer is 5 KB and the current system profile is substantially similar to exemplary profile A, then the map/unmap time of 113 ms, data copy time of 133 ms, and delta of −20 ms for the 5,498 byte transfers may be deemed to be substantially similar in size to the size of the data in the transfer request.

In operation 804, it may be determined whether the time delta or difference (from data structure 500) between the data copy mode and map/unmap mode transfer times is below a threshold for a requested data transfer size. If the time delta is greater than the threshold, the DMA transfer mode may be determined to be the mode with the shortest transfer time in operation 808. Continuing the example and assuming that the threshold is 10 ms, the DMA transfer mode may be determined to be the map/unmap mode because 20 ms is greater than the threshold of 10 ms and because the map/unmap mode is 20 ms faster than the data copy mode.

On the other hand, if the time delta is less than the threshold, it may be determined whether to consider additional factors in the determination of a DMA transfer mode in operation 806. Additional factors may be used to determine a DMA transfer mode because the transfer time delta for the data may not be sufficiently predictive if it is within the threshold. Continuing the example but now assuming that the threshold is 100 ms, it may be determined to consider additional factors to determine a DMA transfer mode because 20 ms is less than 100 ms. In operation 810, a DMA transfer mode may be selected based on one or more additional factors. If there are no additional factors to consider, the DMA transfer mode may be determined to be the mode with the shortest transfer time in operation 808.

Additional factors to consider in a determination of DMA transfer mode may include adapter location, number of clients, bus types currently supported, CPU usage metric, memory usage metric, and application or I/O device preference. Each of these factors may be compared to distinct threshold for the respective factor. If a metric associated with the additional factor is outside of a respective threshold, the additional factor may determine the DMA transfer mode.

For example, assume the location code has a threshold of zone 2. Adapter 106A in profile A has a zone of 3, which exceeds the factor specific threshold. Because of the latency associated with location code 3, performance of the requested transfer may not be as fast as the test data transfer and it may be determined to use the data copy mode for the requested transfer.

As a second example, a CPU usage metric or a memory usage metric may be above a specific threshold for a CPU usage factor or a memory usage factor. The CPU and memory usage metrics may be metrics obtained in a time interval, e.g., 50 or 100 ms, immediately previous to the requested transfer. If the CPU usage or memory metric is above its threshold, using the data copy method for the requested DMA transfer may turn out to be slower than the test data transfer and it may be determined to use the map/unmap copy mode for the requested transfer.

As a third example, an application or an I/O device 136 may indicate a preference for one DMA transfer mode or the other. An application or an I/O device 136 may "know" that it will be sending a particular number of data transfers in a time interval immediately subsequent to the requested transfer and may specify a preference for a particular DMA transfer mode. It may be determined to use the requested mode for the requested transfer.

A device driver 124 may be configured to determine how to use the data in data structure 500 for a current system profile. A DMA unit 134, I/O adapter 106, and device driver 124 may provide support for two or more DMA channels for a given function. The device driver controlling the I/O adapter 106 having multiple channels may be configured to split the header and payload of a packet. The header data may be transmitted over a first channel, e.g., DMA channel A, while the payload data may be transmitted over a second channel, e.g., DMA channel B. The sizes of the header and payload would almost certainly differ. A device driver 124 may determine to transfer the header and payload using different DMA transfer modes.

As another example, in various embodiments four DMA channels may be configured for transmitting (intact) packets of different sizes. For example, channel A is used for packets up to 100 bytes, channel B is used for packets between 101 and 1K bytes, channel C is used for packets between 1,001 bytes and 50 KB, while Channel D is used for packets over 50 KB. According to various embodiments, a device driver 124 may determine to select a different DMA transfer mode for a requested DMA transfer based on the channel to be used. The determination of which DMA transfer mode to use that is likely to be most suitable for minimizing latency or maximizing throughput may depend on the channel to be used.

Referring back to FIG. 1, in various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The computer system 100 may include some or all of the hardware and/or computer program elements of the computer system 100. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100 and that, when read and executed by one or more processors in the computer system 100, or when interpreted by instructions that are executed by one or more processors, cause the computer system 100 to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be used. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (a non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be used and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

A variety of examples are presented in this Detailed Description. These examples may be referred to as exemplary. Note that the term "exemplary," as used in this Detailed Description, simply means an example, instance, or illustration. This term is not used to mean that a particular example is superior, commendable, or otherwise deserving of imitation over other examples.

While this disclosure has described the details of various embodiments shown in the drawings, these details are not intended to limit the scope of the invention as claimed in the appended claims.

What is claimed is:

1. A system for determining a direct memory access (DMA) transfer mode, comprising:
   a DMA unit to receive a request for a DMA data transfer and to perform the requested DMA data transfer using a determined DMA transfer mode; and
   an I/O adapter to determine the DMA transfer mode for the requested DMA data transfer based on the size of the requested DMA data transfer and profile data of the I/O adapter, the DMA transfer mode being one of a first mode or a second mode,
      wherein, in the first mode, a first region of system memory is pre-allocated for use in DMA transfers, and
      wherein, in the second mode, a second region of system memory for use in a particular DMA transfer is allocated for the particular DMA transfer and deallocated when the particular DMA transfer is complete.

2. The system of claim 1, wherein the profile data for the I/O adapter includes a physical location of the I/O adapter.

3. The system of claim 1, wherein the profile data for the I/O adapter includes a number of clients supported by the I/O adapter.

4. The system of claim 3,
   wherein the system memory includes a hypervisor and at least one logical partition of the system memory, and
   wherein one or more of the clients supported by the I/O adapter is a logical partition.

5. The system of claim 1, wherein the profile data for the I/O adapter includes an indication as to whether the I/O adapter includes a capability to transfer data using one of two or more network technologies.

6. The system of claim 1, further comprising the I/O adapter being configured to determine a DMA transfer mode for the requested DMA data transfer based on a preference of an application or an I/O device.

7. The system of claim 1, further comprising the I/O adapter being configured to determine a DMA transfer mode for the requested DMA data transfer based on a CPU usage metric being outside of a threshold for the CPU usage metric, the CPU usage metric being determined in a time interval immediately previous to the request for a DMA data transfer.

8. The system of claim 1, further comprising the I/O adapter being configured to determine a DMA transfer mode for the requested DMA data transfer based on a memory usage metric being outside of a threshold for the memory usage metric, the memory usage metric being determined in a time interval immediately previous to the request for a DMA data transfer.

9. The system of claim 5, wherein the two or more network technologies include Ethernet and Fibre Channel.

* * * * *